Oct. 11, 1960 H. N. BEVERIDGE 2,955,778
MISS-DISTANCE INDICATOR
Filed March 12, 1958 2 Sheets-Sheet 1
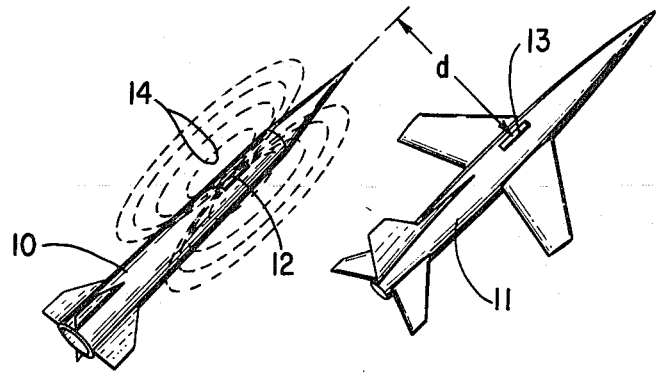
FIG. 1
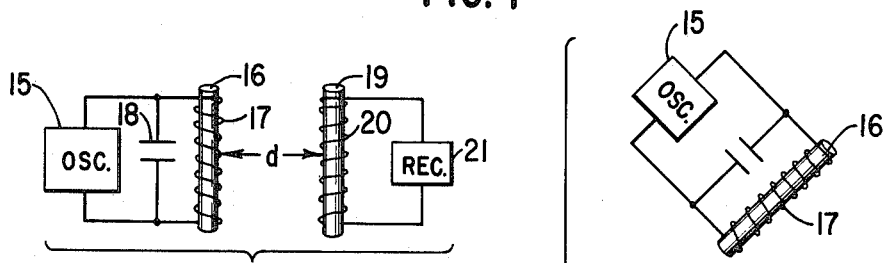
FIG. 2
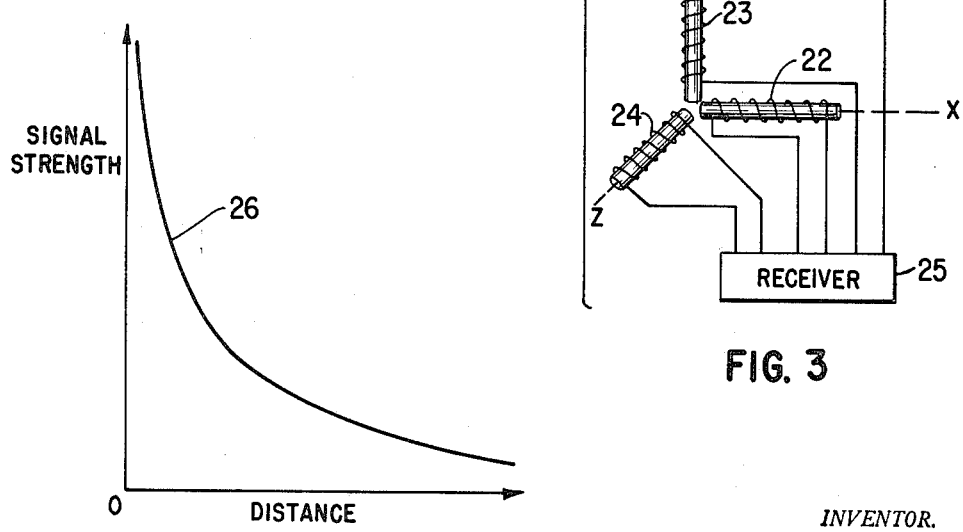
FIG. 3
FIG. 4
INVENTOR.
HAROLD N. BEVERIDGE
BY
ATTORNEY Oct. 11, 1960 H. N. BEVERIDGE 2,955,778
MISS-DISTANCE INDICATOR
Filed March 12, 1958 2 Sheets-Sheet 2

INVENTOR.
HAROLD N. BEVERIDGE
BY
ATTORNEY

2,955,778
Patented Oct. 11, 1960

2,955,778

MISS-DISTANCE INDICATOR

Harold N. Beveridge, Santa Barbara, Calif., assignor, by mesne assignments, to Curtiss-Wright Corporation, a corporation of Delaware Filed Mar. 12, 1958, Ser. No. 720,953

3 Claims. (Cl. 244—14)

This invention relates generally to distance measuring systems and more particularly to an improved miss-distance indicator applicable to missiles and the like for indicating the proximity of the missile to a target or drone.

Many different devices and systems have been proposed heretofore for indicating the miss-distance between a missile or projectile and a target. The majority of these systems operate on the radar or doppler principle, and, while effective, are still relatively complicated, require considerable maintenance, and have limited accuracy.

Bearing the above in mind, it is a primary object of the present invention to provide an improved miss-distance indicating system which is considerably more accurate than systems proposed heretofore.

More particularly, objects of the invention are to provide a miss-distance system of the above type which is simple and inexpensive, relatively compact and light, and which requires a minimum of maintenance.

Briefly, these and many other objects and advantages of the present invention are attained by providing a low frequency radio transmitter in the missile and a simple receiver in the drone or target and employing the near-field of the transmitter as a medium for indicating the miss-distance. The near-field of a low frequency radio transmission is characterized in that it falls off inversely as the cube of the distance from the transmitting source. Therefore by detecting the signal strength of the received signal, an indication of miss-distance is provided.

In one embodiment of the invention, the transmitting antenna comprises a single ferrite stick wound with an exciting coil. The receiver may similarly include a single ferrite stick for detecting the transmitted signal. In a second embodiment, the receiver employs three orthogonally positioned ferrite sticks so that the transmitted polarized signal will always be detected regardless of the relative orientation between the transmitter and receiver. Suitable conversion means are incorporated in the receiver for providing an indicating signal that is a function of the vector sum of the signal components received in the three antennae. Because the intensity of the signal falls off inversely as the cube of the distance between the missile and drone, the variation in the indicating signal is relatively large for small incremental distance changes.

A better understanding of the invention and its various features and advantages will be had by referring to preferred embodiments thereof as illustrated in the accompanying drawings in which:

Figure 1 is a schematic view of a missile and drone;

Figure 2 is another schematic illustration of the basic components comprising one embodiment of the miss-distance indicating system of the present invention;

Figure 3 is another schematic of a second embodiment of the invention;

Figure 4 is a plot of signal strength versus distance of the near field of a low frequency transmitter;

Figure 5:
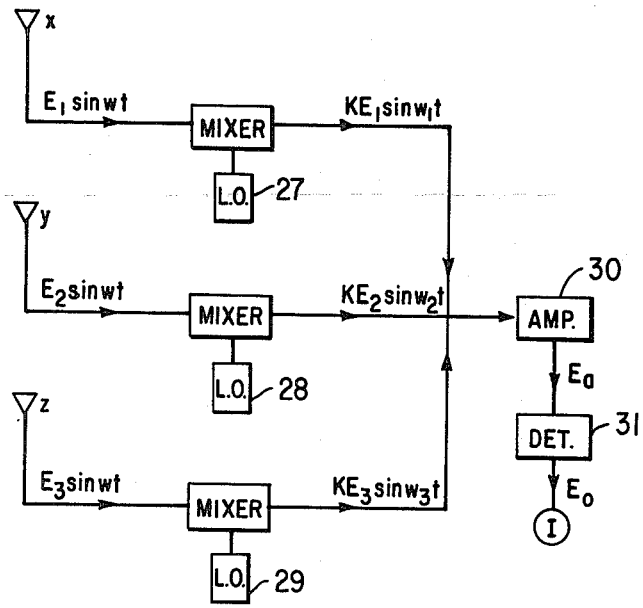
Figure 5 is a schematic diagram of a first circuit for providing an output signal in the receiver of Figure 2; and, Figure 6 is a schematic diagram of a second circuit which could be used as a substitute for the circuit of Figure 5.

Referring first to Figure 1, there is illustrated, by way of example, a missile 10 passing close to a drone or target 11. The miss-distance in this case is shown at $d$. Within the missile 10 there is carried a transmitter indicated schematically at 12 and in the drone 11 there is carried a radio receiver system indicated schematically at 13. The field pattern generated by the transmitter 12 is shown at 14.

The basic principle of operation of the present invention makes use of the fact that the intensity of the near field 14 of the transmitter 12 falls off inversely as the cube of the distance $d$ between the missile and drone. Therefore, by recording in the drone the intensity of the received signal as a function of time, the closest approach of the missile to the drone will be indicated by the maximum value of the signal. By employing a simple conversion chart, the actual distance in feet can be readily computed. Alternatively, the receiver may be connected to cooperate with a smoke pot or the like which can be ignited if the intensity of the signal exceeds a certain value. This maximum value in turn can be made to represent any desired miss-distance. Thus, triggering of the smoke pot will provide a visual indication to a ground crew as to whether or not the missile came within the predetermined miss-distance.

Referring now to Figure 2, there is illustrated the transmitter and receiver for transmitting and detecting the near field. As shown, the transmitter may comprise a simple oscillator 15, arranged to excite an antenna comprising a ferrite stick 16 wound with a coil 17 in a tank circuit including condenser 18.

The receiver 13 may include a receiving antennae in the form of a ferrite stick 19 wound with a suitable receiving coil 20 connected to a receiver circuit 21. Maximum voltage will be induced in the receiving coil from the radiation transmitted from the antenna 17 when the coil is parallel to the field of the transmitting antenna as the missile makes its closest approach.

In the event that the direction of missile travel is not parallel to the movement of the drone, it is preferable to provide three orthogonally positioned ferrite sticks provided with coils 22, 23, and 24 as shown in Figure 3. The voltage induced in the respective coils when they are not aligned with the transmitting antenna field is then proportional to the cosine of the angle formed with the field. Therefore, the vector sum of each of the components of the transmitted signal induced in the three respective orthogonal receiving antennae will represent a quantity which is equal to that which would be detected by the single antenna whose coil 20 is parallel to the field of the transmitting antenna.

In Figure 3, the various signal components received in the three antennae are fed to a receiving circuit 25.

Since the intensity of the near field varies inversely as the cube of the distance between the transmitter and the receiver, the signal strength will exhibit wide variations for small changes in distances between the transmitter and receiver. Thus, referring to Figure 4, there is illustrated a plot 26 of distance $d$ versus signal strength wherein it will be noted that small distance variations close to the origin will result in relatively large signal strength variations. This characteristic is highly desirable since the most accurate data is desired when the miss-distance is relatively small.

Referring now to Figure 5, there is illustrated a first conversion means for providing an output signal that is a function of the vector sum of the voltage components induced in the three orthogonal receiving antennae of Figure 3. If X, Y, and Z represents the three orthogonal coordinate axes of the receiving antennae respectively, let the component of the signal received in the antenna oriented in the direction of the X axis be represented in Figure 4 by $E_1 \sin wt$. Similarly for the Y antenna, let the component of the received signal be presented by $E_2 \sin wt$ and for the Z antenna by $E_3 \sin wt$. These signals are fed respectively to three mixers supplied with three distinct frequencies from local oscillators 27, 28, and 29, respectively.

There are thus provided at the outputs of the three mixers three distinct intermediate frequencies having amplitudes proportional to the amplitudes of the respective components induced in the three antennae. These signals are represented by $KE_1 \sin w_1t$, $KE_2 \sin w_2t$, $KE_3 \sin w_3t$ and are passed through an amplifier 30. The signal output $E_a$ from the amplifier 30 may then be represented by:

$$E_a = K'(E_1 \sin w_1t + E_2 \sin w_2t + E_3 \sin w_3t)$$

where $K'$ is a new constant including the amplification factor. From the amplifier 30, the signal $E_a$ is then passed through a square law detector 31 to provide an output signal given by:

$$E_0 = K''\left(\frac{E_1^2}{2} + \frac{E_2^2}{2} + \frac{E_3^3}{2} + \text{A.C. components}\right)$$

Thus, the direct current component of the output signal $E_0$ is proportional to the sum of the squares of the individual magnitudes of the components and therby is in turn a function of the square of the amplitude of the original signal.

If desired, this output signal $E_0$ may be recorded in the drone and thus provide a continuous record for various firings. Alternatively, an indicating circuit shown at I in Figure 5 may be arranged to trigger a smoke pot or other visual indicating means only when the output signal $E_0$ is equal to or exceeds a predetermined maximum value. Therefore, there will be immediately indicated to a ground crew whether or not the missile passed within a predetermined distance of the drone. Such predetermined distance ordinarily would be determined by the lethal range of the missile if it is set to be detonated automatically when within a given range of a target.

Figure 6:
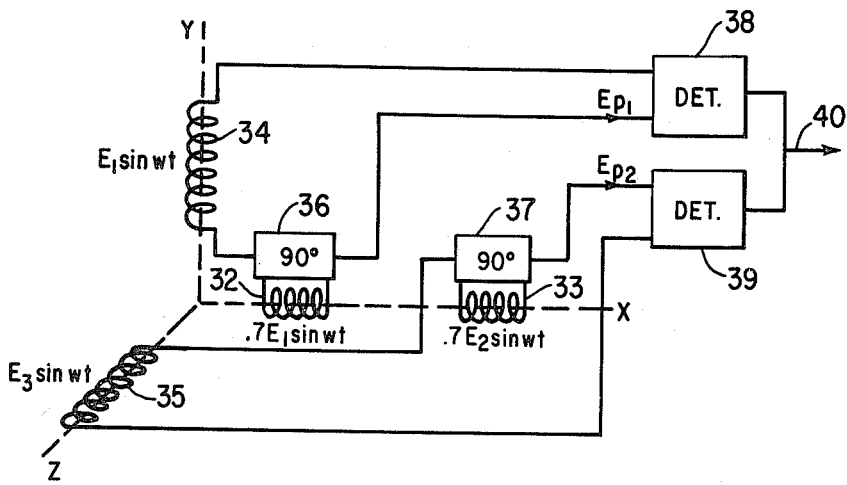

Referring now to Figure 6 there is illustrated an alternative embodiment for converting the various signal components in the there orthogonal antennae to a signal that is a function of the vector sum of the components respectively. In this embodiment, the receiving antenna along the X-axis is split into two sub-antennae indicated at 32 and 33. The coils comprising these antenna each have .7 of the number of turns employed on either one of the other two antennae oriented with respect to the Y and Z axes. In other words, the induced voltage in each of the sub-antennae, 32 and 33, is only .7 of that which would be induced in either of the other two antennae, 34 and 35, were they aligned in a like direction to that of the sub-antennae.

As shown in Figure 6, the voltage induced in the sub-antenna 32 is shifted in phase 90 degrees by a phase shift network 36 and added to the voltage induced in the antenna 34. The output $E_{p1}$ of these two antennae may therefore be expressed by:

$$E_{p1} = E_1 \sin wt + .7 E_2 \cos wt.$$

Similarly, the output of the sub-antenna 33 is shifted in phase 90 degrees by the phase shift network 37 and added to the component from the antenna 35 to provide a second sub-total given by:

$$E_{p2} = E_3 \sin wt + .7 E_2 \cos wt.$$

These respective sub-totals are then fed through two square law detectors 38 and 39 respectively to provide signals proportional to $(E_1^2 + .5 E_2^2)$ and $(E_3^2 + .5 E_2^2)$. Adding these outputs from the detectors at 40 provides a resultant output signal having a direct current portion which is proportional to the sum of the squares of the amplitudes of $E_1$, $E_2$, and $E_3$. As in the embodiment of Figure 5, the output at 40 may be connected to trigger a smoke pot or other suitable indicating or recording devices.

While only two particular detecting circuits have been described in connection with this invention, it will be evident to those skilled in the art that other means may be employed for providing an output signal that is a function of the signal components induced in the three orthogonally positioned receiving antennae. This invention therefore is not to be thought of as limited to the specific examples chosen for illustrative purposes.

What is claimed is:

1. A system for indicating the minimum miss-distance between a missile and a drone comprising, in combination: a transmitter on said missile; a receiver on said drone; three orthogonally positioned receiving antennae in said receiver for providing a signal responsive to the intensity of the near field generated by said transmitter; conversion means connected to said antennae for providing said signal as a function of the vector sum of the signal components generated in each of said antennae; and an indicator responsive to said signal only when said signal attains a given magnitude for indicating if said missile and drone pass each other within said minimum miss-distance.

2. A system for indicating the distance between first and second members, comprising, in combination: a transmitter on said first member; a receiver on said second member, said receiver including three orthogonally positioned antennae; and means in said receiver connected to said antennae for providing a signal responsive to the intensity of the near field generated by said transmitter, said signal constituting a function of the vector sum of the signal components generated in each of said antennae, said means comprising three mixer circuits connected to said three antennae, respectively; three local oscillators connected to said mixer circuit for beating said signal components with the three different oscillator frequencies respectively to provide three distinct intermediate frequencies; amplifying means for amplifying said intermediate frequencies; and a square law detector for detecting and adding the squares of the amplitudes of said three intermediate frequencies to provide said signal.

3. A system for indicating the distance between first and second members, comprising, in combination: a transmitter on said first member; a receiver on said second member, said receiver including three orthogonally positioned receiving antennae; and means in said receiver connected to said antennae for providing a signal responsive to the intensity of the near field generated by said transmitter, said signal constituting a function of the vector sum of the signal components generated in each of said antennae, one of said antennae being split to provide two sub-antennae coaxially oriented and each having physical characteristics providing an induced voltage equal to .7 of the voltage induced in either one of the other two antennae oriented in a like direction to said sub-antenna; said means including first phase shift means for shifting the phase of the signal component in one of said sub-antenna 90° and adding said shifting component to the voltage component in one of said other two antennae to provide a first sub-total signal; second phase shift means for shifting the phase of the signal component in the other of said sub-antennae 90° and adding said shifting component to the voltage component in the other of said other two antennae to provide a second sub-total signal; and first and second square law detectors connected to receive said first and second sub-total signals respectively and add same after detection to provide said signal.

References Cited in the file of this patent

UNITED STATES PATENTS

| | | |
|---|---|---|
| 1,666,897 | Hammond | Apr. 24, 1928 |
| 1,885,023 | Dickman | Oct. 24, 1932 |
| 2,282,030 | Busignies | May 5, 1942 |
| 2,448,587 | Green | Sept. 7, 1948 |
| 2,628,836 | Gangel | Feb. 17, 1953 |